United States Patent [19]

Sperry

[11] 3,976,230

[45] Aug. 24, 1976

[54] SYSTEM FOR DISPENSING POLYURETHANE AND THE LIKE

[75] Inventor: Charles R. Sperry, Wilton, Conn.

[73] Assignee: Instapak Corporation, Danbury, Conn.

[22] Filed: Oct. 7, 1974

[21] Appl. No.: 512,441

Related U.S. Application Data

[63] Continuation of Ser. No. 318,167, Dec. 26, 1972, abandoned.

[52] U.S. Cl. .......................... 222/146 HE; 219/307; 219/328
[51] Int. Cl.² .......................................... B67D 5/62
[58] Field of Search .............. 222/146 HE; 239/304; 219/306, 307, 381, 382, 328

[56] References Cited
UNITED STATES PATENTS

| | | | |
|---|---|---|---|
| 2,833,909 | 5/1958 | Levey | 219/302 X |
| 2,890,836 | 6/1959 | Gusmer et al. | 239/117 |
| 3,097,288 | 7/1963 | Dunlap | 219/307 |
| 3,263,928 | 8/1966 | Gusmer | 239/142 X |
| 3,687,370 | 8/1972 | Sperry | 239/112 |
| 3,770,938 | 11/1973 | Agarate | 219/331 X |

Primary Examiner—Robert B. Reeves
Assistant Examiner—Joseph J. Rolla
Attorney, Agent, or Firm—Albert Siegel

[57] ABSTRACT

A polyurethane foam dispensing system wherein electrical lines in the conduits thereof are used to controllably heat the foam precursor materials and to maintain such material at optimum temperature for foam formation. A thermistor at the dispensing end of such conduits senses the temperature of the throughput material and controls the heating element(s) by feedback therefrom.

3 Claims, 4 Drawing Figures

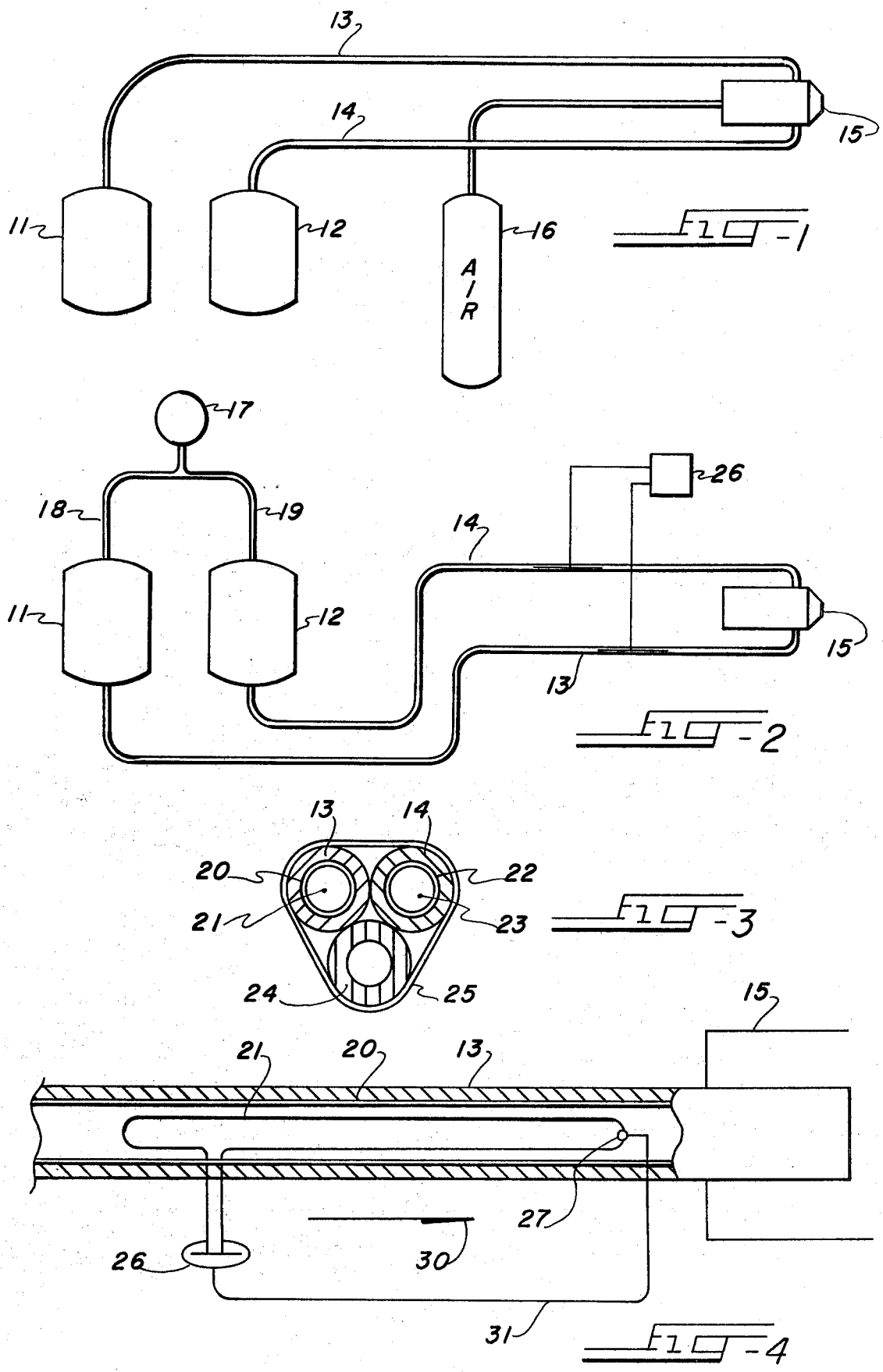

SYSTEM FOR DISPENSING POLYURETHANE AND THE LIKE

REFERENCE TO OTHER APPLICATION

The application is a continuation of my co-pending application Serial No. 318,167 filed December 26, 1972, now abandoned.

BACKGROUND OF THE INVENTION

This invention relates to a dispensing system for liquids, especially polyurethane foam precursor chemicals, and more particularly is directed to such a system wherein the chemicals are heated under precisely controlled conditions in the conducting lines thereof.

In the work which led to the present invention, I have been dealing principally with polyurethane foam components which require heating above ambient temperatures in order to result in a useful foam product. While such chemicals are well-known to those skilled in this art, in order to fully explain the operation of this system I would briefly allude to these reactants.

Polyurethane foams are normally produced by the reaction of two principal constituents generically classified as polyols and polyisocyanates.

The polyols generally are selected from the group consisting of polyethers, polyesters, polythioethers, polyesteramides, alkylene glycols and polyisocyanate modifications thereof, which materials are characterized by a molecular weight greater than 500 and which have at least two reactive hydroxyl groups per molecule. Examples of the foregoing are poly (oxyethylene) glycols and poly (oxypropylene) glycols or copolymers of these materials which collectively may be referred to as poly (oxyalkylene) ethers. As is well-known to the chemists skilled in this art, there are numerous compounds which fall within this "polyol" category and the literature thereon is quite extensive.

The other principal reactant in the polyurethane foam making reaction are aromatic or aliphatic polyisocyanates. Also included are substitute of aromatic polyisocyanates. Representative examples of these materials are 2, 4-toluene diisocyanate; 2, 6-toluene diisocyanate; ethylene diisocyanate; ethylidine diisocyanate; propylene-1, 2-diisocyanate; butylene-1, 2-diisocyanate; hexylene-1, 6-diisocyanate; cyclohexylene-1, 2-diisocyanate and many others.

In addition to the polyols and polyisocyanates, the usual polyurethane precursor materials also contain one or more of blowing agents, surfactants, catalysts, fillers and stabilizers. These are usually contained in either the polyol or polyisocyanate constituent.

Certain polyurethane foam compositions are usable at ambient temperatures but these are not basically the materials which are to be used in the present dispensing system. I am principally interested in using those foam materials herewith wherein a modest, but very carefully controlled heating thereof is required. To understand why such careful heating is necessary requires some additional discussion.

While polyurethane foam has become a staple item of commerce it should be recognized that the production of such foam involves the use of rather sensitive chemicals, somewhat difficult to work with, and that it is extremely important, if acceptable foams are to result, that there be good mixing of well measured, fairly exacting amounts, of the two basic materials. If the two constituents are not well mixed prior to dispensing or prior to the initiation of the foaming reaction, one does not obtain an acceptable foam. Furthermore, if there is an excess of one reactant over the other acceptable foams will not result.

These general statements are especially true in the area of polyurethane foaming in place packaging where most of my efforts in the present invention have been directed. The foam going into the package has to be correct or the package has to be remade or may fail in use which are not particularly attractive from either a functional or economic standpoint.

While the polyurethane foaming reaction is usually exothermic in nature most of the regularly used chemical components have to be moderately heated prior to the initiation of the reaction. This is normally done, of necessity for several reasons. The constituents are usually viscous and heating brings one or both of them down to a viscosity range where it or they can be reasonably handled. Also, since the two components normally widely differ in viscosity, but change in viscosity differently as a function of increasing temperature by controlling the temperature of the reactants, one can substantially match the two viscosities. This is important in obtaining good mixing of the two chemicals.

And, of course, heating is important in "triggering" the foam reaction.

It is, of course, understood that the heating cannot be too high without serious detrimental effects. As a practical matter with the polyurethane reactions that I have been using, a temperature of 130°F is preferred.

In the past the materials have been heated to the appropriate temperature in their containers. This requires heaters for the containers, heavily insulated lines, and still does not assure that the temperature is correct at the critical point of mixing and pour. Also, the heating of the containers detracts from the instantaneous operation of the system -- when a new container replaces a depleted one, the operator must wait until the appropriate temperature is achieved. As the containers have to be preheated; or for example one might have to leave the heat on overnight in order to assure that the unit will function properly at the start of operations the next morning. Combined with this are the limitations on hose length between container and pour point. Cooling down at the latter has to be avoided.

All of the foregoing problems are overcome by the use of the present invention. The reactants are electrically heated in the conduits thereby making it unnecessary to heat or preheat in the container and reactant temperatures are carefully sensed at and appropriately fed back from, the dispensing end of the system.

In view of this a principal object of my invention is to provide a polyurethane foam dispensing system wherein the chemical reactants thereof are brought to a carefully controlled optimum reaction temperature by electrical heating within the conduits thereof.

DESCRIPTION OF THE DRAWINGS

This and other objects, features and advantages of our invention will become apparent to those skilled in this art from the accompanying drawings in which:

FIGS. 1 and 2 schematically illustrate the system of the present invention;

FIG. 3 is a cross-sectional view illustrating the structure of the heater lines of the present invention;

FIG. 4 illustrates the heating control system of this invention.

DESCRIPTION OF THE INVENTION

FIG. 1 generally illustrates the present polyurethane foam dispensing system and as illustrated merely in the drawing is of course comparable to known systems in the prior art. There is a container of polyol 11 and one for isocyanate 12. These feed respectively via conduits 13 and 14 to a dispensing gun 15. There may be intervening metering pumps or the like (not illustrated) to propel the polyol and isocyanate constituents to and through the dispensing gun or in the embodiments which I prefer the containers are merely pressurized, e.g., with dry nitrogen, for the same purpose.

In the preferred embodiments hereof, the two chemical containers are at an equal internal pressurization and by this means the chemicals are forced therefrom when the dispensing gun is in the open or pour position.

The dispensing gun 15 may take a variety of forms, many of which are known in the prior art. In the most simple terms this may be a mixing chamber for the two basic polyurethane constituents to insure good mixing thereof before ejection of the material to where it is to be used. Where the containers 11 and 12 are controlled by on-off metering pumps, the gun 15 may be a simple tube if clogging is not particularly a problem. On the other hand, when the containers are pressurized, there must be some dispensing control mechanism adapted on the gun itself.

While the present system may employ a variety of dispensers, I prefer to use the gun which is described in my recently issued U.S. Pat. No. 3,687,370 (also owned by the assignee hereof) and the disclosure of such earlier patent is incorporated by reference herein. With the use of such or similar dispensing guns, a mechanism must be provided for the opening and closing thereof. Although other means can be used, I prefer a compressed air system for moving a piston which in turn moves a valving rod from a retracted to a protracted position within the confines of a mixing chamber. Ports open into such mixing chamber which ports are controlled by the valving rod. In FIG. 1 the numeral 16 denotes an air supply for controlling the valving rod of the dispenser 15.

By employing the present system I am able to move polyurethane precurser chemicals from their respective receptacles at ambient temperature to a dispensing point where such chemicals are at the proper temperature for mixing and reacting. For example, I start with chemicals at room temperature and pass them through a 25 foot conduit at the outlet of which the temperature has been raised to 130°F. And such temperature is very carefully controlled as herein provided. For a general understanding as to how this is accomplished reference should next be had to FIG. 2.

Again there are the two containers, 11 and 12, for the polyurethane precurser materials with their respective outlet conduits 13 and 14. Both said receptacles are equally pressured by a gas (e.g. dry nitrogen) from source 17 via gas conduits 18 and 19.

Such pressurization technique is standard in the art. The receptacles must be of adequate strength to withstand the pressurization. The chemicals employed are liquids. Pressurization is from above the liquid level while the chemicals are drawn off from the bottom. While they are not illustrated in FIG. 2 appropriate fittings are employed between the various members.

At this point in the disclosure reference should be had to FIGS. 3 and 4 for an understanding of the heater mechanism in the lines hereof and the control mechanism therefor.

FIG. 3 schematically illustrates in cross-section the composite conduit member for use herewith. Conduit 13 (polyol) has a relatively thick wall 20 made of rubber or "Teflon" with an electrical wire 21 running therethrough. Such wire is preferably copper having an insulating lacquer coated thereon. When current is passed through said wire it serves as the heating element.

Conduit 14 is an exact counterpart to 13 having a wall member 22 with a lacquer coated electrical wire 23 running therethrough.

A third conduit, 24, may be provided for compressed air when such is used to activate the dispensing gun. The three conduits are encased in a flexible covering 25.

Reference should now be had to FIG. 4 illustrating the heating and control for one such reactant conduit. The wire 21 is energized by an electrical power source, 26, preferably a.c.. A calibrated thermistor 27, or other equivalent temperature sensing device, is positioned in the downstream end of the conduit. (Direction of flow is indicated by the arrow 30.) Signals from the thermistor are fed via lead 31 back to the electrical power supply 26 to control the output thereof. If the temperature of the reactant flowing in the conduit is slightly too high the thermistor generated signal shuts off or reduces the input power to the line 21. Or it increases such power if the temperature is slightly too low.

Exactly the same mechanism is provided in the other conduit. There is thermistor temperature sensing with feedback to the electrical power supply.

It should be noted that with the present system one may have different, but controlled, temperatures in the two conduit lines. By this means the viscosity of the reactants may be well-controlled. Furthermore, more than two lines can be used where more than a two component reaction is employed.

It will be understood that various modifications and variations hereof may be effected without departing from the spirit or scope of the novel concept of this invention.

I claim as my invention:

1. In a system for dispensing a reactive mixture of at least two reacting substances such as polyurethane precurser chemicals wherein said substances are required to be heated above ambient temperature to cause proper and timely reaction thereof and which system includes receptacles for said reacting substances, conduits therefor and a common dispensing means at the output end of said conduits, the improvements comprising:

a. a conduit member for each such reacting substance extending from the receptacle thereof to said common dispensing means for the reaction mixture;

b. an electrically conducting wire heating element, comprising the sole heating means in the present system, loosely positioned in the bore of each such conduit member and adapted to be in intimate contact with the reacting substance therein, which heating element extends essentially from the input end to the output end of said conduit and which heating element is capable of raising the temperature of flowing reacting substance from ambient temperature, lower than the reacting temperature, to proper and constant reaction temperature at the output end as it passes through the length of said conduit;

c. an electrical power supply for said heating element; and d. a temperature sensing device positioned in the bore of at least one of said conduits downstream and adjacent the output end thereof, said device directly controlling the output of said electrical power supply and thus indirectly the energization of said heating element whereby the temperature of said reacting substance at said output end is maintained substantially constant at reaction temperature.

2. The improvement as defined in claim 1 wherein said reacting substances are polyurethane foam precurser chemicals and there are two said conduit members.

3. The improvement as defined in claim 1 wherein said temperature sensing device is a thermistor.

* * * * *

REEXAMINATION CERTIFICATE (1941st)

United States Patent [19]

Sperry

[11] B1 3,976,230

[45] Certificate Issued Mar. 9, 1993

[54] SYSTEM FOR DISPENSING POLYURETHANE AND THE LIKE

[75] Inventor: Charles R. Sperry, Wilton, Conn.

[73] Assignee: Instapak Corporation, Danbury, Conn.

Reexamination Request:
No. 90/002,051, Jun. 12, 1990

Reexamination Certificate for:
Patent No.: 3,976,230
Issued: Aug. 24, 1976
Appl. No.: 512,441
Filed: Oct. 7, 1974

Related U.S. Application Data

[63] Continuation of Ser. No. 318,167, Dec. 26, 1972, abandoned.

[51] Int. Cl.$^5$ .............................................. B67D 5/62
[52] U.S. Cl. ................................. 222/146.5; 392/472; 392/480; 392/495

[58] Field of Search ................... 222/146.5; 239/304; 219/306, 307, 381, 382, 328

[56] References Cited

U.S. PATENT DOCUMENTS

| | | | |
|---|---|---|---|
| 2,583,761 | 1/1952 | Axelson | 219/381 |
| 2,833,909 | 5/1958 | Levey | 219/298 |
| 2,890,836 | 6/1959 | Gusmer et al. | 239/117 |
| 3,097,288 | 7/1963 | Dunlap | 219/307 |
| 3,263,928 | 8/1966 | Gusmer | 239/123 |
| 3,687,370 | 8/1972 | Sperry | 239/112 |
| 3,770,938 | 11/1973 | Agarate | 219/374 |

*Primary Examiner*—Gregory L. Huson

[57] ABSTRACT

A polyurethane foam dispensing system wherein electrical lines in the conduits thereof are used to controllably heat the foam precursor materials and to maintain such material at optimum temperature for foam formation. A thermistor at the dispensing end of such conduits senses the temperature of the throughput material and controls the heating element(s) by feedback therefrom.

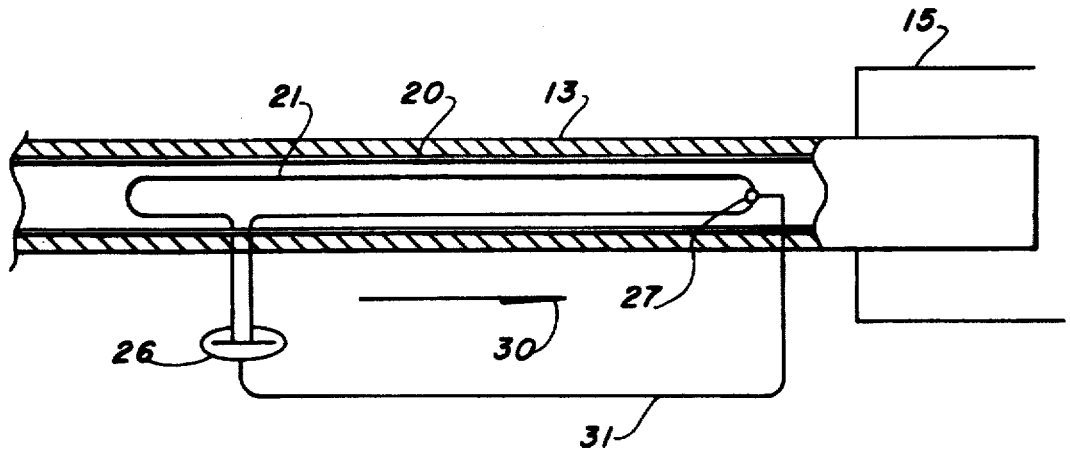

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2 and 3 are cancelled.

* * * * *